(12) United States Patent
Hamanaka

(10) Patent No.: US 10,009,502 B2
(45) Date of Patent: Jun. 26, 2018

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takahiro Hamanaka, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 15/867,798

(22) Filed: Jan. 11, 2018

(65) Prior Publication Data

US 2018/0139348 A1    May 17, 2018

Related U.S. Application Data

(63) Continuation of application No. 15/407,359, filed on Jan. 17, 2017, now Pat. No. 9,900,461.

(30) Foreign Application Priority Data

Jan. 26, 2016    (JP) ................. 2016-012472

(51) Int. Cl.
*H04N 1/04*     (2006.01)
*H04N 1/29*     (2006.01)
*H04N 1/028*    (2006.01)

(52) U.S. Cl.
CPC .......... *H04N 1/295* (2013.01); *H04N 1/0283* (2013.01); *H04N 1/0432* (2013.01);
(Continued)

(58) Field of Classification Search
CPC .... H04N 1/295; H04N 1/0283; H04N 1/0432; H04N 2201/0081; H04N 2201/0082; H04N 2201/0427
(Continued)

(56) References Cited

U.S. PATENT DOCUMENTS

2007/0070459 A1* 3/2007 Furukawa ................ H04N 1/52
358/504
2017/0146924 A1* 5/2017 Horiuchi .................. H04N 1/00

FOREIGN PATENT DOCUMENTS

JP          02-282763       11/1990

* cited by examiner

*Primary Examiner* — Houshang Safaipour
(74) *Attorney, Agent, or Firm* — Amin, Turocy & Watson LLP

(57) ABSTRACT

In accordance with an embodiment, an image forming apparatus comprises a deflector, a photoconductor, a mirror, a displacement mechanism and a control section. The deflector deflects laser light emitted from a light source to an optical path of each color in a horizontal scanning direction. The photoconductor is located in each optical path and forms an image of each color through development of an electrostatic latent image formed by being exposed by the laser light. The mirror is located in each optical path and reflects the laser light to each corresponding photoconductor. The displacement mechanism is arranged on each mirror and displaces the mirror in order to correct an inclination shift between images of respective colors. The control section corrects a magnification of the image of each color in the horizontal scanning direction according to an inclination correction amount of the image of each color.

20 Claims, 4 Drawing Sheets

(52) U.S. Cl.
CPC ............... *H04N 2201/0081* (2013.01); *H04N 2201/0082* (2013.01); *H04N 2201/0477* (2013.01)

(58) Field of Classification Search
USPC .......................................... 358/518, 510, 1.9
See application file for complete search history.

IMAGE FORMING APPARATUS

CROSS-REFERENCE TO RELATED APPLICATIONS

This application is a Continuation of application Ser. No. 15/407,359 filed on Jan. 17, 2017, the entire contents of which are incorporated herein by reference.

This application is based upon and claims the benefit of priority from Japanese Patent Application No. 2016-012472, filed Jan. 26, 2016, the entire contents of which are incorporated herein by reference.

FIELD

Embodiments described herein relate generally to a correction technology for shifting between images of respective colors.

BACKGROUND

Conventionally, in an image forming apparatus of a tandem system, there are times when positions of formed images are shifted between respective colors, and thus control of alignment is executed.

However, along with the execution of the control of the alignment, there are times when the images of the respective colors are expanded and contracted with respect to a horizontal scanning direction, and as a result, a shift is generated in the images of the respective colors which should be overlapped on occasions.

DETAILED DESCRIPTION

In accordance with an embodiment, an image forming apparatus comprises a deflector, a photoconductor, a mirror, a displacement mechanism and a control section. The deflector deflects laser light emitted from a light source to an optical path of each color in a horizontal scanning direction. The photoconductor is located in each optical path and forms an image of each color through development of an electrostatic latent image formed by being exposed by the laser light. The mirror is located in each optical path and reflects the laser light to each photoconductor. The displacement mechanism is arranged on each mirror and displaces the mirror in order to correct an inclination shift between images of respective colors. The control section corrects a magnification of the image of each color in the horizontal scanning direction according to an inclination correction amount of the image of each color.

In accordance with another embodiment, an image forming method involving deflecting laser light emitted from a light source to an optical path of each color in a horizontal scanning direction; forming an image of each color through development of an electrostatic latent image formed by being exposed by the laser light; reflecting the laser light with a mirror located in each optical path to a corresponding photoconductor in each optical path; displacing the mirror in order to correct an inclination shift between images of respective colors; and correcting a magnification in the horizontal scanning direction in the image of each color according to an inclination correction amount of the image of each color.

Figure 1:
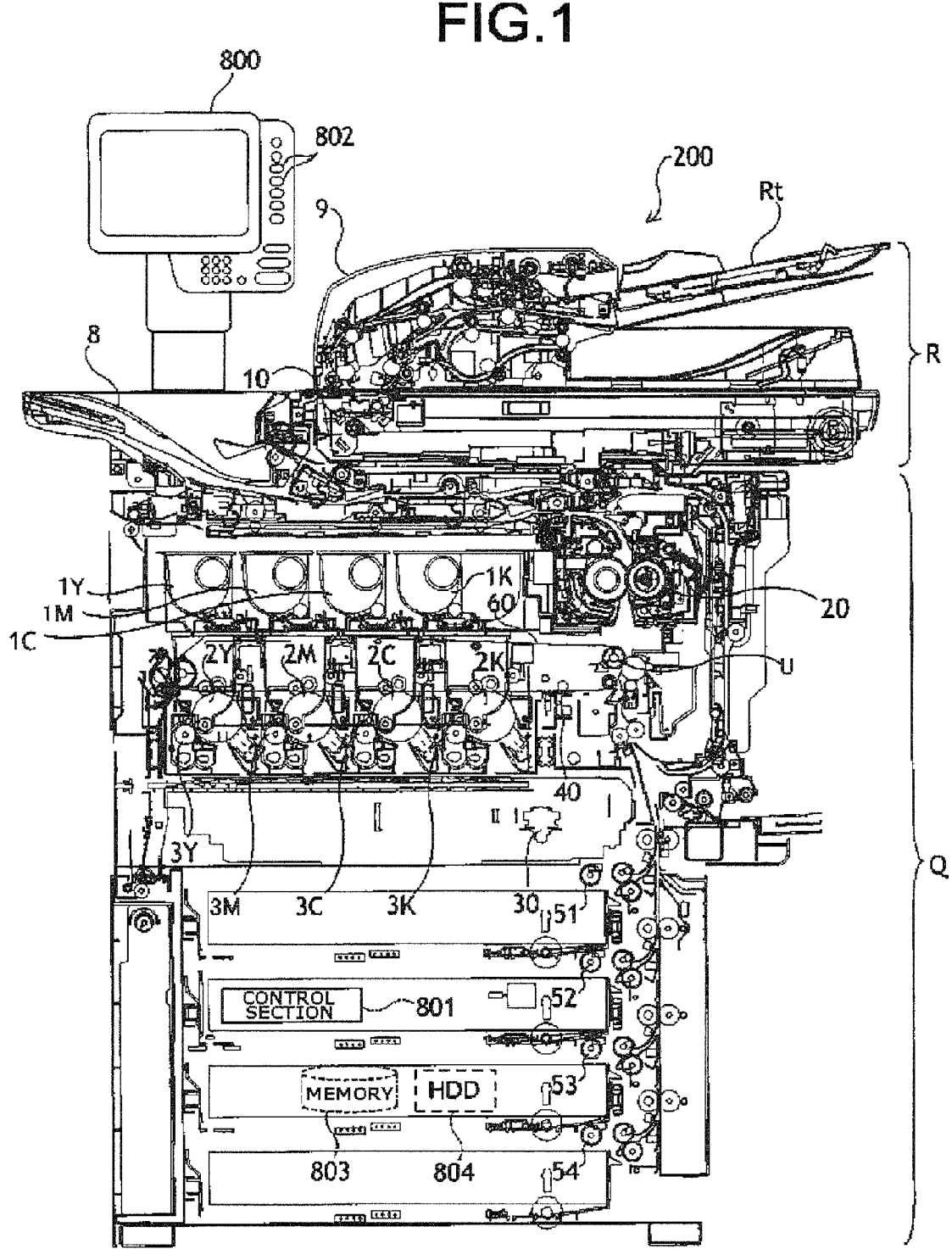
FIG. 1 is a diagram illustrating an image forming apparatus.

FIG. 1 is a diagram illustrating an image forming apparatus 200.

A control section 801 of the image forming apparatus 200 which is a CPU (Central Processing Unit) executes a program stored in a memory 803, and carries out a variety of processing of the image forming apparatus 200. An HDD 804 stores image data read by an image reading section R. A display section 800 displays setting information or an operational status, log information and a notification to a user of the image forming apparatus 200. An input section 802 receives an input of the user.

Hereinafter, a copy processing by the control section 801 is described.

The control section 801 reads a document on a document tray Rt which is fed by an automatic document feeder 9 with a scanning optical system 10. The control section 801 picks up sheets from cassettes with pick-up rollers 51~54 and conveys the sheets to a secondary transfer position U with a plurality of conveyance rollers. The control section 801 forms electrostatic latent images on photoconductive drums 2Y~2K with a laser optical system 30 on the basis of the image data of the document read by the image reading section R. The 2Y~2K refer to 2Y, 2M, 2C and 2K. Hereinafter, the same applies to other reference numerals. Toner cartridges 1Y~1K supply yellow (Y) toner, magenta (M) toner, cyan (C) toner and black (K) toner to developing devices 3Y~3K. The control section 801 drives the developing devices 3Y~3K, develops the electrostatic latent images on the photoconductive drums 2Y~2K with the toner of Y~K, and forms toner images of Y~K on the photoconductive drums 2Y~2K.

The control section 801 transfers the toner images of Y~K on the photoconductive drums 2Y~2K onto a transfer belt 60 in the order of Y, M, C and K in an overlapped manner, and forms one color image on the transfer belt 60. The control section 801 rotates the transfer belt 60 and transfers the image on the transfer belt 60 to the sheet at the secondary transfer position U. The control section 801 discharges the sheet onto a discharge tray 8 after heating the sheet with a fixing device 20 and fixing the image on the sheet.

There is a sensor 40 at a position facing an area between the photoconductive drum 2K and the secondary transfer position U in a rotational direction of the outer peripheral surface of the transfer belt 60 (in the counterclockwise direction in FIG. 1). A pair of the sensors 40 including photo diodes is arranged in parallel in the vertical direction of the sheet surface in FIG. 1. Although described later, the sensor 40 captures a test pattern for aligning images.

Figure 2:
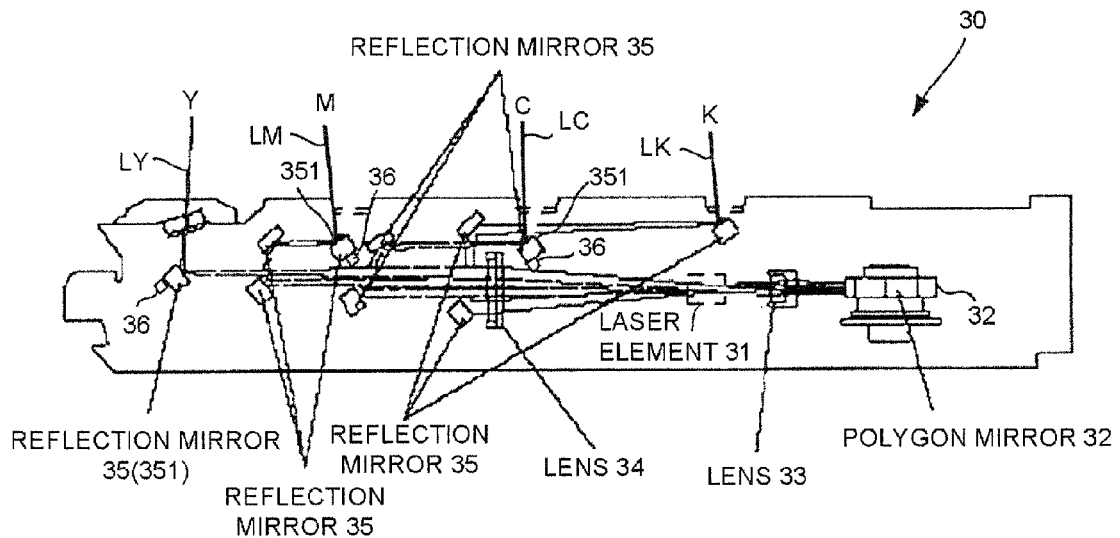
FIG. 2 is a diagram illustrating the configuration of a laser optical system.

FIG. 2 is a diagram illustrating the configuration of the laser optical system 30.

The laser optical system 30 is provided with a light source 31, a polygon mirror 32 (deflector), fθ lenses 33 and 34, a reflection mirror 35 and a displacement mechanism 36. The light source 31 is a semiconductor laser element and arranged for each of Y~K. The polygon mirror 32 deflects laser light emitted by respective light sources 31 to optical paths LY~LK of Y~K in a horizontal scanning direction. The horizontal scanning direction refers to a direction along the axial direction of the photoconductive drums 2Y~2K at the time the laser light is emitted to the photoconductive drums 2Y~2K.

The fθ lenses 33 and 34 enable the laser light reflected by the polygon mirror 32 to scan on the photoconductive drums 2Y~2K at a constant speed, and enables the laser light to vertically enter the photoconductive drums 2Y~2K.

The reflection mirror 35 is located in each of the optical paths LY~LK, and reflects the laser light to each of the photoconductive drums 2Y~2K. One reflection mirror 35 is located in the optical path LY, three reflection mirrors 35 are located in each of the optical paths LM~LK. Hereinafter, among the reflection mirrors 35 of Y~C other than K, the reflection mirrors 35 at the front stages of the photoconductive drums 2Y~2C are described as reflection mirrors 351.

The displacement mechanism 36 is arranged on each of the reflection mirrors 351 of Y~C. In the present embodiment, as the image forming apparatus 200 carries out the alignment of images by taking K as a reference color, the displacement mechanism 36 is arranged only on each of the reflection mirrors 351 of Y~C but not on the reflection mirror 35 of K. Furthermore, the reference color at the time of the execution of the alignment of images may be any one of Y~K.

Figure 3:
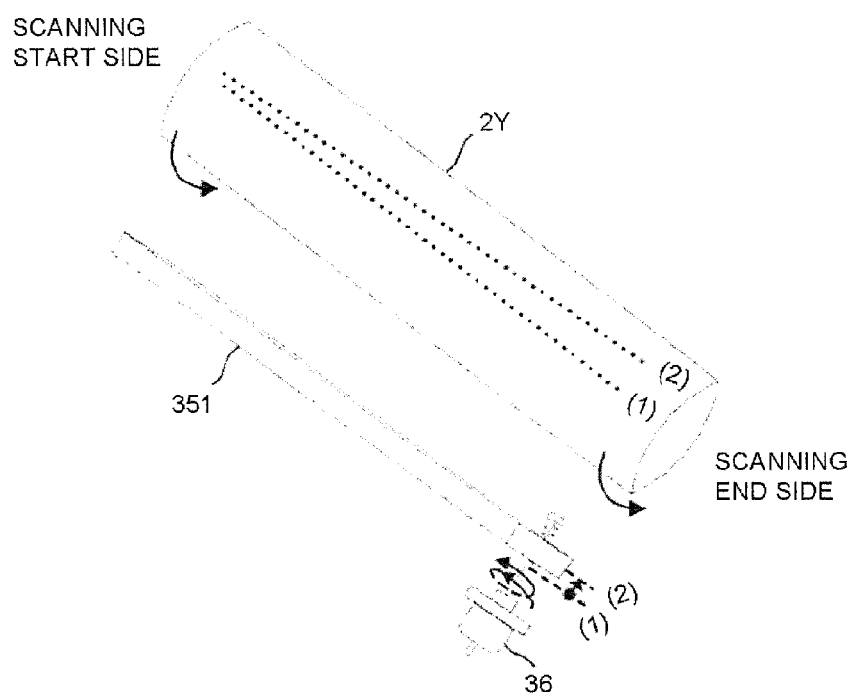
FIG. 3 is a perspective view illustrating a displacement mechanism arranged a reflection mirror for Y.

FIG. 3 is a perspective view illustrating the displacement mechanism 36 arranged on the reflection mirror 351 of Y. The displacement mechanisms 36 of M and C also have the same configuration as the displacement mechanism 36 in FIG. 3.

The displacement mechanisms 36 of Y~C respectively displace the reflection mirrors 351 of Y~C in order to correct an inclination shift between images of Y~K formed on the photoconductive drums 2Y~2K. The displacement mechanisms 36 displace end parts at scanning end sides in the horizontal scanning direction of the reflection mirrors 351 with respect to the photoconductive drums 2Y~2C by taking end parts at scanning start sides as centers. The displacement mechanisms 36 make the reflection mirrors 351 close to the photoconductive drums 2Y~2C by rotating motors in one direction, and make the reflection mirrors 351 separated from the photoconductive drums 2Y~2C by rotating the motors in other directions.

Figure 4:
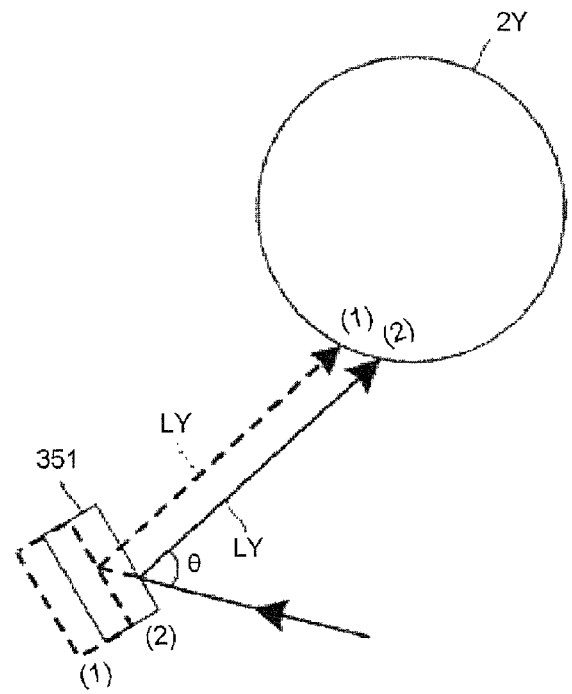
FIG. 4 is a diagram illustrating change of an optical path length at the time of displacement of the reflection mirror.

FIG. 4 is a diagram illustrating change of an optical path length at the time of the displacement of the reflection mirror 351.

In the reflection mirrors 351 of Y~C, an angle θ between incident light and reflected light is an acute angle. In a case in which the angle θ is the acute angle, if the reflection mirrors 351 are displaced by the displacement mechanisms 36, the optical path lengths LY~LC from the light sources 31 to the photoconductive drums 2Y~2C are changed. Then, on each of the photoconductive drums 2Y~2C, a position of an image pixel (beam spot) in the horizontal scanning direction is shifted with respect to an ideal position, and a distance between image pixels is shifted with respect to an ideal distance, in other words, a magnification shift in the horizontal scanning direction is generated.

For example, if the displacement mechanism 36 makes the reflection mirror 351 close to the photoconductive drum 2Y from (1) position to (2) position in FIG. 4, the optical path length LY from the light source 31 to the photoconductive drum 2Y becomes short. Thus, the distance between the image pixels becomes small with respect to the ideal distance, and the magnification in the horizontal scanning direction becomes small with respect to an ideal magnification.

At the time of the correction of the inclination shift between the images of Y~K, if the reflection mirrors 351 of Y~C are displaced, the magnification shift in the horizontal scanning direction is generated between Y~C. Sizes of the magnification shift in the horizontal scanning direction between the images of Y~C are different from each other as displacement amount of the reflection mirrors 351 of Y~C are different from each other. Further, as the end part at the scanning end side of the reflection mirror 351 is displaced by taking the end part at the scanning start side as the center, the displacement amount becomes large at the scanning end side of the reflection mirror 351. Therefore, generation ways of the position shift of the image pixels in the horizontal scanning direction are also different in areas in the horizontal scanning direction. As a result, the magnification shift in the horizontal scanning direction between the images of Y~K is generated due to the correction of the inclination shift between the images of Y~K.

Thus, the control section 801 corrects the magnification in the horizontal scanning direction between the images of Y~C according to the displacement amount of the reflection mirrors 351 of Y~C for correcting the inclination shift between the images of Y~K. hereinafter, a shift correction processing between the images by the control section 801 is described.

Figure 5:
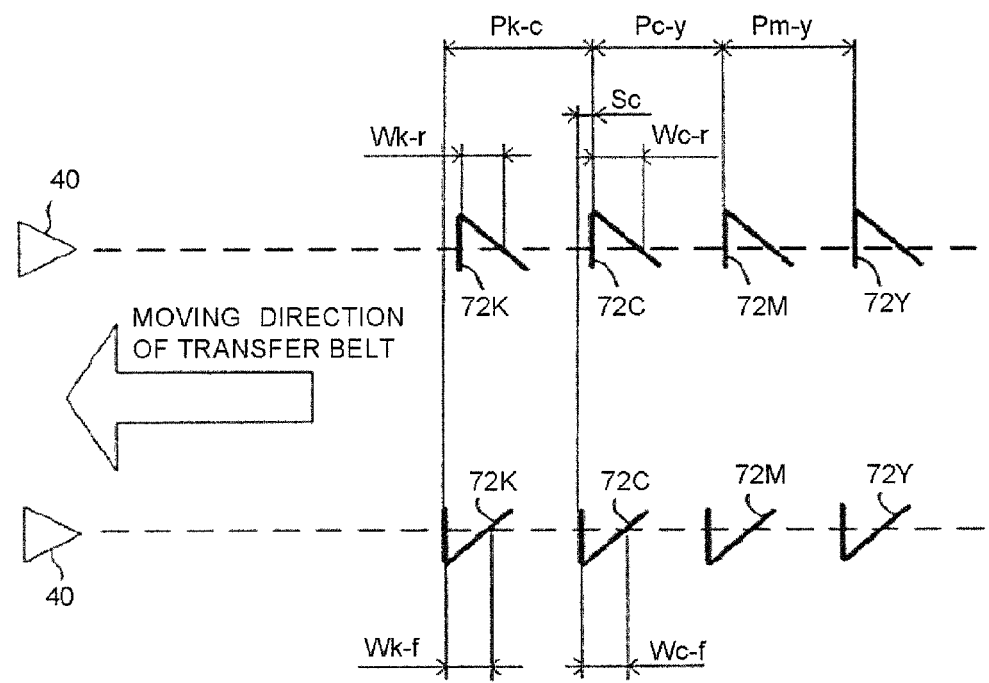
FIG. 5 is a diagram illustrating a test pattern for alignment.

The control section 801 carries out the following shift correction processing when accumulated time of Ready modes for receiving jobs reaches prescribed time at the time of warming up and at the time the number of copies reaches the prescribed number. The control section 801 forms wedge-shaped test patterns 72Y~72K on the transfer belt 60 along a vertical scanning direction as shown in FIG. 5 if the execution condition of the shift correction processing is met. The test patterns 72Y~72K of four colors of Y, M, C and K are set as one set. The control section 801 forms two sets of the test patterns 72Y~72K in the horizontal scanning direction.

The control section 801 captures the test patterns 72Y~72K with the sensor 40.

The control section 801 corrects the position shift of the images of Y~C by setting the reference color as K in the present embodiment on the basis of shift amount of the test patterns 72Y~72K.

The control section 801 calculates shift amount (Pk-c), (Pc-m) and (Pm-y) of parallelism in the vertical scanning direction of the test patterns 72Y~72K from a captured result, and corrects writing positions of the laser light in the vertical scanning direction on the basis of the shift amount.

The control section 801 calculates shift amount (Wx-r)–(Wk-r) (x=y, m, c) of parallelism in the horizontal scanning direction of the test patterns 72Y~72K from the captured result, and corrects writing positions of the laser light in the horizontal scanning direction on the basis of the shift amount.

The control section 801 calculates inclination shift amount Tx (x=y, m, c) of the test patterns 72Y~72K from the captured result, and displacement amount Gx (x=y, m, c) of the reflection mirrors 351 of Y~C on the basis of the shift amount. The control section 801 displaces the reflection mirrors 351 of Y~C by only the displacement amount Gx (x=y, m, c).

The control section 801 calculates inclination correction amount Sx (x=y, m, c) of the images of Y~C caused by the displacement of the reflection mirrors 351 of Y~C on the basis of the inclination shift amount Tx (x=y, m, c).

The control section 801 calculates magnification shift amount ((Wx-r)+(Wx-f))−((Wk-r)+(Wk-f)) (x=y, m, c) in the horizontal scanning direction of the test patterns 72Y~72K from the captured result, and first correction amount Mox (x=y, m, c) of an image clock on the basis of the shift amount. The first correction amount Mox is calculated for each of Y~C. The first correction amount Mox is described later, but the same value is used over each area in the horizontal scanning direction.

As stated above, in order to correct the inclination shift between the images of Y~K, if the reflection mirrors 351 of Y~C are displaced, the magnification shift in the horizontal scanning direction of the images of Y~C is generated. Thus, the control section 801 corrects a frequency of the image clock according to the inclination correction amount Sx (x=y, m, c) of the images of Y~C, and in this way, corrects the magnification in the horizontal scanning direction of the images of Y~C.

Further, in the present embodiment, as the end part at the scanning end side of the reflection mirror 351 is displaced, the displacement amount of the optical path length becomes large at the scanning end side of the reflection mirror 351. Therefore, the generation ways of the position shift of the image pixels in the horizontal scanning direction are also different in the areas in the horizontal scanning direction. Thus, the control section 801 corrects the frequency of the image clock corresponding to each area in the horizontal scanning direction according to the inclination correction amount Sx (x=y, m, c) of the image of each area in the horizontal scanning direction.

Furthermore, the inclination correction amount Sx (x=y, m, c) of the images has a correspondence relationship with the displacement amount Gx (x=y, m, c) of the reflection mirror 351, and is in proportion to the displacement amount Gx (x=y, m, c) of the reflection mirror 351. Therefore, "correct the frequency of the image clock according to the inclination correction amount Sx (x=y, m, c) of the images of Y~C" includes a mode for correcting the frequency of the image clock according to the displacement amount Gx (x=y, m, c) of the reflection mirror 351 or the inclination shift amount Tx (x=y, m, c) of the test patterns 72Y~72K.

In the present embodiment, it is considered to divide areas for scanning lasers in the horizontal scanning direction on the photoconductive drums 2Y~2C into 32 segments at a Pmm pitch. Numbers of all the segments are assigned with 1, 2, . . . , 31 and 32 from the scanning start side. The central area in horizontal scanning direction is the segment 16.

The control section 801 calculates second correction amount ΔM(N) of the image clocks corresponding to the inclination correction amount Sx (x=y, m, c) of the images in the segments N (N=1~32) with the following formulas (1) and (2). Then, the control section 801 adds the second correction amount ΔM(N) of the segments N in the horizontal scanning direction to the first correction amount Mox of the image clocks calculated on the basis of the magnification shift amount in the horizontal scanning direction of the test patterns 72Y~72K as shown in the following formula (3). In this way, the control section 801 calculates the correction amount M(N) of the image clock corresponding to each segment N in the horizontal scanning direction.

$$\Delta M(N) = \alpha * \left( \frac{N-16}{P} * \beta x \right) \quad (1)$$

$$\beta x = \delta x * Sx(x=y, m, c) \quad (2)$$

$$M(N) = Mox + \Delta M(N)(x=y, m, c) \quad (3)$$

α in the formula (1) is the correction coefficient (0<α<1), and P is a pitch (MM) for dividing the horizontal scanning area into 32 segments. βx is equivalent to magnification shift amount accompanying the inclination correction (displacement of the reflection mirror 351). The formula (2) is a formula indicating βx, and δx in the formula (2) is the correction coefficient ($-1*10^{-6}$). The inclination correction amount Sx (x=y, m, c) is positive in a direction close to the photoconductive drums 2Y~2C. The correction amount M(N) in the formula (3) is equal to the frequency modulation amount (%) of the image clock. As sizes of the first correction amount Mox and the correction coefficient δx are different for each of Y~C, the correction amount M(N) of Y~C is different even if the inclination correction amount Sx (x=y, m, c) is the same.

As to Y, in the case of $\delta Y = -2*10^{-6}$, α=2/3 and P=10 (mm), the control section 801 calculates the second correction amount ΔM(N) of the image clock for each segment N as stated below. Furthermore, the second correction amount ΔM(N) for the segment 1 is set to 0.

N=1: ΔM(1)=0

N=2: ΔM(2)=(2/3)*((2−16)/10*(−2*10−6)*Sy)

N=3: ΔM(3)=(2/3)*((3−16)/10*(−2*10−6)*Sy)

:

N=16: ΔM(16)=(2/3)*((16−16)/10*(−2*10−6)*Sy)

:

N=32: ΔM(32)=(2/3)*((32−16)/10*(−2*10−6)*Sy)

Figure 6:
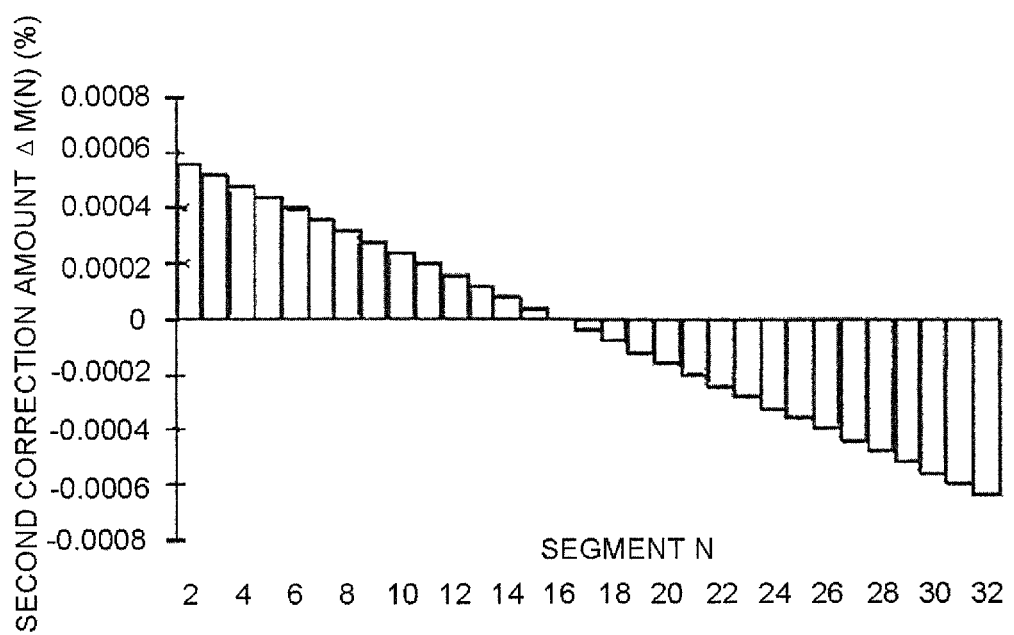
FIG. 6 is a diagram illustrating correction amount ΔM(N) of each segment N.

FIG. 6 is a diagram illustrating the second correction amount ΔM(N) of each segment N in a case in which the inclination correction amount Sy of the image of Y is 200 (μm).

If the frequency of the image pixel clock is small, an interval between the image pixels in the horizontal scanning direction is expanded, and the horizontal scanning magnification becomes large. On the contrary, if the frequency of the image pixel clock is large, the interval between the image pixels in the horizontal scanning direction is contracted, and the horizontal scanning magnification becomes small.

In a case in which the reflection mirror 351 is displaced to approach the photoconductive drum 2Y through the inclination correction at the scanning end side (at the side corresponding to the segment 32), the optical path length becomes short in the optical path LY of the laser light at the scanning end side. Therefore, the horizontal scanning magnification of the image formed on the photoconductive drum 2Y becomes small at the scanning end side.

Thus, the control section 801 corrects the image pixel clock so that the frequency of the image pixel clock becomes small at the scanning end side in the horizontal scanning direction as shown in FIG. 6. As the horizontal scanning magnification becomes large if the frequency of the image pixel clock becomes small, in this way, the horizontal scanning magnification can become large at the scanning end side in the horizontal scanning direction. Therefore, at the scanning end side in the horizontal scanning direction, due to the inclination correction, the influence caused when the horizontal scanning magnification becomes small can be eliminated through the correction on the image pixel clock, and as a result, the horizontal scanning magnification shift of the images between Y~K can be eliminated.

As stated above, in the present embodiment, by setting the correction amount M(N) of the frequencies of the image clocks for respective segments N in the horizontal scanning direction, the frequencies of the image clocks can be modulated in part, and the horizontal scanning magnification considering the inclination correction amount can be set. In the present embodiment, by adopting such a configuration, partial color shift due to the influence of the inclination correction can be eliminated.

What is claimed is:

1. An image forming apparatus, comprising:
a deflector configured to deflect laser light emitted from a light source to an optical path of each color in a horizontal scanning direction;
a photoconductor located in each optical path and configured to form an image of each color through development of an electrostatic latent image formed by being exposed by the laser light;
a mirror located in each optical path and configured to reflect the laser light to each corresponding photoconductor, one end portion of each mirror is arranged to be apart from and close to each corresponding photoconductor by rotating a motor, so that the image on the photoconductor is inclined; and
a control section configured to correct a magnification in the horizontal scanning direction in the image of each color according to an inclination correction amount of the image of each color.

2. The image forming apparatus according to claim 1, wherein
the control section corrects a frequency of an image clock corresponding to each area according to the inclination correction amount in the horizontal scanning direction.

3. The image forming apparatus according to claim 1, wherein
in the control section, a correction amount of magnifications in the horizontal scanning direction of the images of the respective colors is different with respect to the same corresponding inclination correction amount.

4. The image forming apparatus according to claim 2, wherein
in the control section, a correction amount of magnifications in the horizontal scanning direction of the images of the respective colors is different with respect to the same corresponding inclination correction amount.

5. The image forming apparatus according to claim 1, wherein
the displacement mechanism displaces an end part of a scanning end side in the horizontal scanning direction of the mirror with respect to the photoconductor by taking the end part of the scanning start side as a center.

6. The image forming apparatus according to claim 1, wherein
in the mirror, an angle between incident light and reflected light is an acute angle.

7. The image forming apparatus according to claim 1, wherein
the optical path of each color comprises optical paths for yellow, magenta, cyan, and black.

8. The image forming apparatus according to claim 1, wherein
the control section is further configured to calculate a shift amount of parallelism in the horizontal scanning direction of test patterns from a captured result, and correcting writing positions of the laser light in the horizontal scanning direction on a basis of the shift amount.

9. The image forming apparatus according to claim 1, wherein
the control section is further configured to calculate the inclination shift amount of test patterns from a captured result, and a displacement amount of the mirrors on a basis of the inclination shift amount.

10. The image forming apparatus according to claim 1, wherein
the control section is further configured to calculate an inclination correction amount of the images caused by displacement of the mirrors on the basis of the inclination shift amount.

11. An image forming method, comprising:
deflecting laser light emitted from a light source to an optical path of each color in a horizontal scanning direction;
forming an image of each color through development of an electrostatic latent image formed by being exposed by the laser light;
reflecting the laser light with a mirror located in each optical path to a corresponding photoconductor in each optical path;
rotating a motor so that so that each image on the photoconductor is inclined; and
correcting a magnification in the horizontal scanning direction in the image of each color according to an inclination correction amount of the image of each color.

12. The image forming method according to claim 11, further comprising:
correcting a frequency of an image clock corresponding to each area according to the inclination correction amount in the horizontal scanning direction.

13. The image forming method according to claim 11, wherein
a correction amount of magnifications in the horizontal scanning direction of the images of the respective colors is different with respect to the same corresponding inclination correction amount.

14. The image forming method according to claim 12, wherein
a correction amount of magnifications in the horizontal scanning direction of the images of the respective colors is different with respect to the same corresponding inclination correction amount.

15. The image forming method according to claim 11, further comprising:
displacing an end part of a scanning end side in the horizontal scanning direction of the mirror with respect to the photoconductor by taking the end part of the scanning start side as a center.

16. The image forming method according to claim 11, wherein
an angle between incident light and reflected light is an acute angle.

17. The image forming method according to claim 11, wherein
the optical path of each color comprises optical paths for yellow, magenta, cyan, and black.

18. The image forming method according to claim 11, further comprising:

calculating a shift amount of parallelism in the horizontal scanning direction of test patterns from a captured result, and correcting writing positions of the laser light in the horizontal scanning direction on a basis of the shift amount.

19. The image forming method according to claim 11, further comprising:

calculating the inclination shift amount of test patterns from a captured result, and a displacement amount of the mirrors on a basis of the inclination shift amount.

20. The image forming method according to claim 11, further comprising:

calculating an inclination correction amount of the images caused by displacement of the mirrors on the basis of the inclination shift amount.

* * * * *